(No Model.)
2 Sheets—Sheet 1.

L. TRAXLER.
PORTABLE SAW MILL.

No. 271,546. Patented Jan. 30, 1883.

WITNESSES:
Thos. Houghton.
Solon C. Kemon

INVENTOR:
L. Traxler
BY
ATTORNEYS.

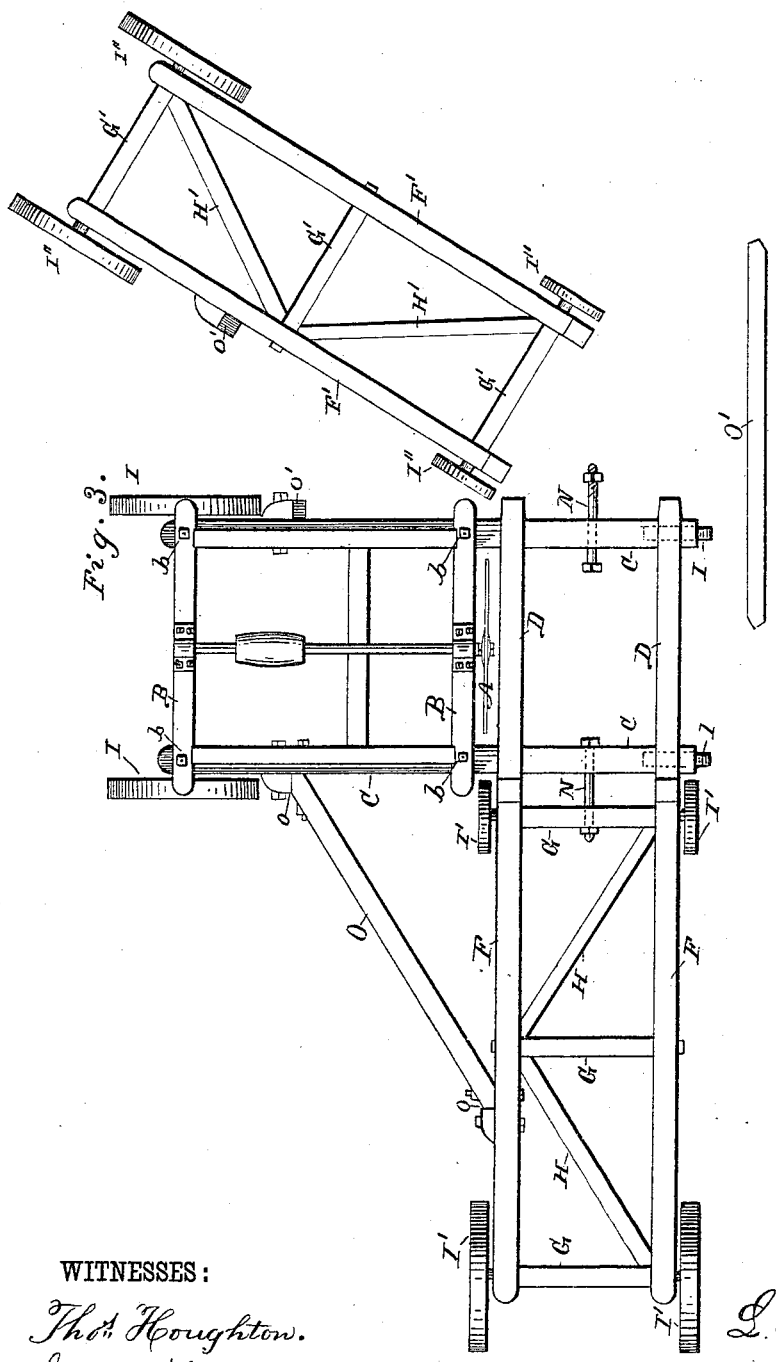

UNITED STATES PATENT OFFICE.

LESTER TRAXLER, OF BUTLER, OHIO.

PORTABLE SAW-MILL.

SPECIFICATION forming part of Letters Patent No. 271,546, dated January 30, 1883.

Application filed August 10, 1882. (No model.)

*To all whom it may concern:*

Be it known that I, LESTER TRAXLER, a citizen of the United States, residing at Butler, in the county of Richland and State of Ohio, have invented a new and useful Improvement in Portable Saw-Mills, of which the following is a specification.

My invention relates to that class of portable saw-mills in which a circular saw has its arbor journaled upon a rectangular frame supported upon a pair of cross-sills and the carriage-track extended at each side thereof upon separable longitudinal sills, a foundation of logs being laid on the ground, secured together and faced off level to serve as a bed for said parts to rest on at each setting up of the mill. Formerly these parts have been constructed with a view to being separated into parts convenient for handling in transportation, with little reference to convenience and facilities for rearranging them any number of times alike without the use of measuring-instruments. For all mills of this class with which I have been acquainted the first thing to be done, after choosing a site to set the mill on, is to place two long timbers side by side on the ground, and to them secure frequent cross-timbers. Then to the top of these, after leveling the surface, spike planks, forming a platform on which to secure the sills of the saw-frame and the sills or timbers, usually in several parts, supporting the carriage-rails; and on the rigidity of this platform depends the accuracy of the working of the mill, and the saw-frame and rail-timbers have to be lined and adjusted relative to each other and secured to said newly-formed platform at every removal. To avoid all these causes of delay in setting up a saw-mill, and to enable any person capable to run a mill to set it up accurately and any number of times alike, and to make the frame more portable, is the object of my invention; and I accomplish this by means of devices combined in the construction of a saw-mill, hereinafter fully described and set forth, reference being had to the accompanying drawings, in which—

Figure 4:
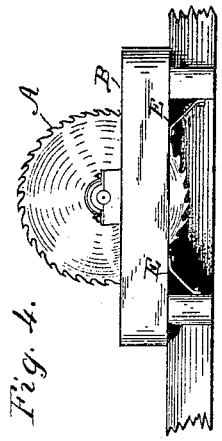
Figure 1:
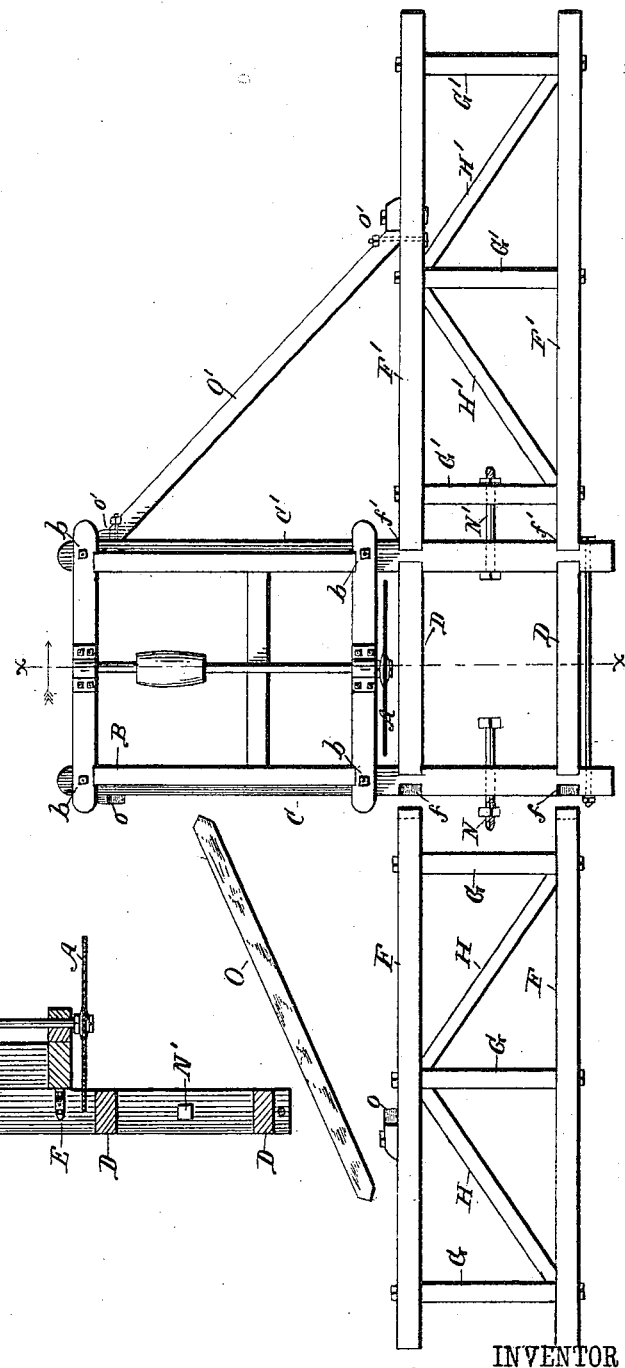
Figure 2:
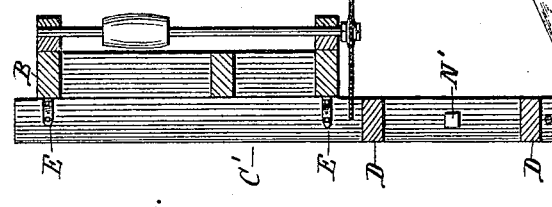

Figure 1 is a plan of my invention. Fig. 2 is a transverse vertical section of the same at $x$ $x$, Fig. 1, part in elevation. Fig. 3 is a plan view, showing the same with my truck-wheel attachment. Fig. 4 is a detail view, showing the corner-braces between parts B and C C'.

A represents the saw; B, the usual frame supporting the saw-bearings. C C' are two timbers joined by ties D, all bolted together, forming a rigid sill-frame, to which the frame B is firmly bolted at the four corners b. Corner-braces E still further secure the frames B C D together. Formerly the frame B was not rigidly or in any way permanently secured upon the timbers C; but it was adjustable thereon for the purpose of bringing the saw in line with the carriage-track, and when so lined blocks were usually nailed onto the timbers C to keep frame B in place against the strain of work and of the saw-belt. Rigidly securing the corners by bolts b prevents this adjustment, and the arrangement of my rail-sills relatively thereto prevents the necessity for any such adjustment after my saw-mill leaves the manufactory.

F F' are the rail-sills, in line with ties D, which carry rails as long as the width of frame C D. These rail-sills F F' are made of one timber each, joined by cross-ties G G' and braces H H', forming two separate rigid frames, F G H and F' G' H'. These frames are attachable to the saw-sill frame C D by means of corner mortises, $f f'$, in the sides of sills C, fitted to receive the ends of the rail-sills F F' snugly, in which position sills F are firmly drawn and held by means of bolts N N', passing through sills C C' and ties G G'. There is nothing new in these corner mortises, their purpose being to fit and hold the ends of sills F rigidly when the parts are joined, yet leave them free to be easily withdrawn on the removal of the bolts N N', and any usual joint that will accomplish this may be used.

O O' are two braces fitted neatly at their ends into notches $o$ $o'$ in the sills C F C' F', to which they are respectively bolted for the purpose of maintaining the rail-sills in line with each other and at right angles to the saw-frame sills. The joints $o$ $o'$ and $f f'$ being nicely and mechanically fitted, the frames may be taken apart at these joints and united, exactly the same as before, any number of times. In the manufactory these timbers and braces are mechanically fitted and mate-marked. The rails are then secured on their sills F F' and the ties D in perfect line. The boxes of the arbor of saw A are then secured to frame B, with the arbor in perfect adjustment to the plane and line of the rails.

The construction described enables any one suitable to run a mill to take it apart for transportation, and, each corner and piece being mate-marked, to set it up again exactly as it was before, thus saving a very large part of the time now used in moving, lining up, and starting mills.

The braces H H' have more service than merely to keep a frame at right angles, like common braces. They serve to transmit the steadying power of the main braces O O' from the sills in direct contact with said braces O O' to the opposite sills, thus preserving the tracks parallel under the strain of the end binders, N N', and the braces O O'.

To prepare a foundation for this mill no timbers have to be bolted together and no platform has to be nailed on. It is only necessary to lay down cross-logs and spot places on which to rest all the sills, or block them up level, bolt the parts of the mill together, and all is ready to start up. Thus my mill may be quickly set up, and by means of my invention as herein set forth the saw-frame is rigidly held against the strain of the saw-belt and of work, so that the saw will not get out of line with the track, and thereby lose the lead given to it, thus saving frequent derangement of machinery, and consequent loss of time, common to the old-style portable saw-mills.

Fig. 3 shows the mill just described divided into three parts and mounted on wheels I I' I'', forming three trucks, ready to travel or ready to be bolted together, as before described, and used standing on the wheels. The drawings show one track-section bolted to the saw-section.

The wheels I I' I'' and running-gear may be of any suitable construction; but I prefer the common heavy wagon-wheels, axles, and tongue, the forward axle turning on a king-bolt. In this case, after choosing a level spot, the trucks are drawn into position and roughly leveled by digging dirt from under any wheels which are too high. Then the braces are put in and all the parts bolted together, when a carpenter's level is applied to the rails and saw-frame sills and the leveling perfected by digging or blocking the wheels, as may be required. The log-carriage will be made, as usual, in two parts, easily separable, yet joined as one in use.

In preparing to move, the movable bolts and braces described are removed and packed away. One section of the carriage is fastened on top of each of the side trucks, and all is ready to start on the road, there being no necessity of removing the saw from the arbor or displacing any part of the machine from its bearings.

Some of the advantages of this invention over the old styles of portable saw-mills are the facility of moving the same from place to place, the ease of setting it up, and the certainty of setting it up right, whereby the same may be done by common laborers and in little time.

By use of my invention the lining up of the saw-frame and tracks, which was formerly done with this class of mills at every removal, and frequently at other times, in common use, is wholly avoided.

By the use of my truck attachment still further economy of time and labor is obtained, as the heavy parts of the mill are always ready loaded for travel, and at the right height for use on arrival without unloading.

I am aware that braces in general and braces crossing frames diagonally are common, and I do not claim such, broadly; but

What I claim, and wish to secure by Letters Patent, is—

1. The saw-frame B, the circular saw A, its arbor and boxes secured thereon, the sills C C', extending beneath and rigidly secured to the frame B, and supporting the two rails in front of the saw, and the ties D, rigidly framed to sills C C', said sills being provided with mortises in their sides to receive tenons of side-track sills, in combination with side-track-supporting sills adapted to fit said mortises, as shown and described.

2. The combination, with the saw-frame B, the sills C C', supporting the same, and the track-supporting ties D, of the track-sills F F', and cross-ties G G', forming rigid separate frames, each frame being detachably secured directly to the sills C C', as shown and described.

3. The combination, with the saw-frame B, the sills C C', supporting the same, the track-supporting ties D, and the track-frames, consisting of the sills F F', cross-ties G G', and braces H H', detachably secured directly to the sills C C', of the braces O O', detachably secured to said track-frames, and the sills C C', as specified, whereby the parts may be aligned without adjustment and so maintained while in use.

4. The combination, with the saw-frame, sills, and wheels forming one truck, of the track-frames and wheels forming two other trucks, bound to the sides of the first truck by detachable bolts, forming a saw-mill mounted on wheels, as shown and described.

LESTER TRAXLER.

Witnesses:
  W. X. STEVENS,
  SOLON C. KEMON.